US008670291B2

(12) United States Patent
Landry

(10) Patent No.: US 8,670,291 B2
(45) Date of Patent: Mar. 11, 2014

(54) METHOD AND APPARATUS FOR TERMINATING ROPE AND ITS APPLICATION TO SEISMIC STREAMER STRENGTH MEMBERS

(75) Inventor: Clet Antoine Landry, Katy, TX (US)

(73) Assignee: PGS Geophysical AS, Lysaker (NO)

( * ) Notice: Subject to any disclaimer, the term of this patent is extended or adjusted under 35 U.S.C. 154(b) by 530 days.

(21) Appl. No.: 12/928,865

(22) Filed: Dec. 21, 2010

(65) Prior Publication Data

US 2012/0155222 A1    Jun. 21, 2012

(51) Int. Cl.
*G01V 1/20*    (2006.01)
(52) U.S. Cl.
CPC ........................................ *G01V 1/20* (2013.01)
USPC .......................................................... 367/153
(58) Field of Classification Search
USPC .......................................................... 367/153
See application file for complete search history.

(56) References Cited

U.S. PATENT DOCUMENTS

| | | | | |
|---|---|---|---|---|
| 6,035,692 | A * | 3/2000 | Lucas | 72/416 |
| 6,170,145 | B1 * | 1/2001 | Lucas | 29/517 |
| 6,477,111 | B1 * | 11/2002 | Lunde et al. | 367/20 |
| 6,830,479 | B2 * | 12/2004 | Holliday | 439/585 |
| 7,142,481 | B1 | 11/2006 | Metzbower et al. | |
| 2002/0187684 | A1 * | 12/2002 | Leve | 439/746 |
| 2008/0008047 | A1 * | 1/2008 | Lunde et al. | 367/154 |
| 2009/0010101 | A1 * | 1/2009 | Lunde et al. | 367/20 |
| 2009/0147621 | A1 * | 6/2009 | Hegna | 367/24 |
| 2010/0061189 | A1 * | 3/2010 | Stenzel et al. | 367/153 |

OTHER PUBLICATIONS

Cortland Cable Company, Inc., (1994), "Fabricating a short splice at the end of a hollow braid", New Technology for New Frontiers Technical Data Sheet, pp. 1-2.
Splicing Manual, (1983), "Nylite Rope Connector", Samson Braided Ropes, 26 pages.

* cited by examiner

*Primary Examiner* — Isam Alsomiri
*Assistant Examiner* — James Hulka

(57) ABSTRACT

A termination for an end of a braid formed as a flat closed loop of braided strands expandable to an annular cylinder having a selected wall thickness includes a sleeve having a selected internal diameter. Spacers are configured to be applied on the braid such that when in contact with each other form an annular cylinder having an external diameter selected to fit inside the sleeve. The spacers have a bevel at one longitudinal end. A substantially cylindrical insert has a bevel at one longitudinal end at substantially a same bevel angle as on the spacers. A diameter of the insert combined with twice the wall thickness of the braid is larger than an internal diameter the spacers. When axial tension is applied to the braid, the bevel on the insert with braid thereon laterally urges the spacers outward. The sleeve limits lateral outward movement of the spacers.

20 Claims, 4 Drawing Sheets

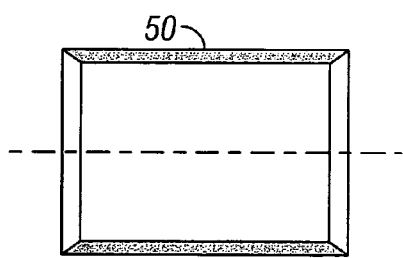
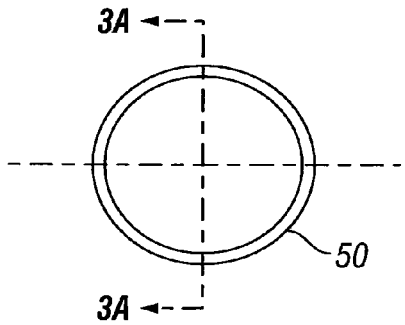
FIG. 3A  FIG. 3B
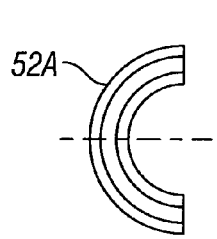
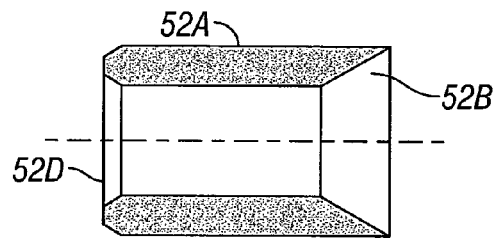
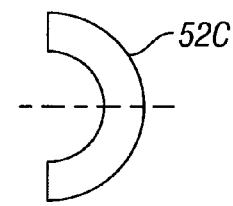
FIG. 4A  FIG. 4B  FIG. 4C
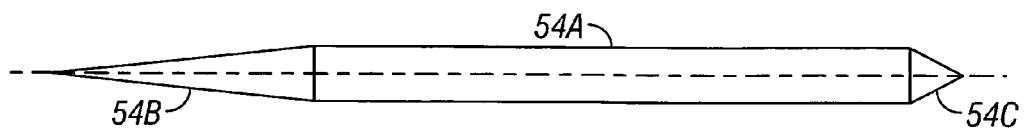
FIG. 5

METHOD AND APPARATUS FOR TERMINATING ROPE AND ITS APPLICATION TO SEISMIC STREAMER STRENGTH MEMBERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates generally to the field of rope and cable terminations. More particularly, the invention relates to methods and apparatus for creating a closed loop at the end of a braided fiber rope of cable to enable coupling the rope of cable to another device. The invention has particular application in the making of seismic streamer segments.

U.S. Pat. No. 7,142,481 issued to Metzbower et al. describes construction of a stretch section used with seismic streamers that are assembled from a plurality of streamer segments coupled end to end. In particular, FIG. 2 in the '481 patent shows a cross section of a typical streamer segment. The streamer segment includes one or more strength members, usually made from woven fiber rope. The one or more ropes are coupled at each of the longitudinal ends thereof to a termination plate. Techniques and devices known in the art for coupling the strength member(s) to the termination plate are difficult and expensive to implement, and may have an axial load bearing capacity that is substantially less than the usable tensile strength of the strength member(s). More specifically, the strength member terminations are designed for conventional rope-type strength members only.

There exists a need for improved strength member terminations.

SUMMARY OF THE INVENTION

One aspect of the invention is a termination for a braid end, wherein the braid is formed as a flat closed loop of braided strands configured to be expanded to a shape of an annular cylinder having a selected wall thickness. The termination includes a sleeve, having a selected internal diameter. Spacers are configured to be applied to an exterior of the braid. A configuration and an external diameter of the spacers when in contact with each other form an annular cylinder having an external diameter selected to fit inside the sleeve. The spacers have a bevel at one longitudinal end thereof. A substantially cylindrical insert has a bevel at one longitudinal end thereof at substantially a same bevel angle as the bevel on the spacers. An external diameter of the insert is selected such that when combined with twice the wall thickness of the braid, such combined diameter is larger than an internal diameter of the annular cylinder formed by the spacers. A result of the foregoing combination is that when axial tension is applied to the braid, the bevel at the longitudinal end of the insert with braid thereon laterally urges the spacers outward, and wherein the sleeve is disposed externally to the spacers to limit lateral outward movement thereof.

A seismic streamer according to another aspect of the invention includes at least one streamer segment. The at least one streamer segment includes at least one strength member extending along a length of the segment and terminated at each longitudinal end by a termination coupled to a termination plate. The at least one strength member comprises a flat woven braid reconfigurable to an annular cylinder having a selected wall thickness. A plurality of spacers is disposed at selected longitudinal positions along the at least one strength member. The streamer includes at least one seismic sensor and a jacket disposed over the exterior of the at least one strength member. The spacers and the at least one seismic sensor. Each termination of the strength member is made according to the above aspect of the invention related to a termination for a braid.

A method for making a loop end termination in a woven braid according to another aspect of the invention, wherein the braid is formed as a flat closed loop of braided strands configured to be expanded to a shape of an annular cylinder, includes tapering a longitudinal end of the braid. A sleeve having a selected internal diameter is applied over the braid from the longitudinal end thereof. The longitudinal end of the braid is looped over a termination coupling. The longitudinal end of the braid is inserted into the braid at a location spaced apart from the termination coupling, the inserting continues to a selected exit point from the braid at a position longitudinally spaced apart from the insertion location. An insert having a selected angle bevel on an insertion end thereof is inserted into the tapered longitudinal end of the braid extending through the exit point. The part of the braid disposed through the exit point is moved back into the braid. Spacers are applied to an exterior surface of the braid proximate the insertion end of the insert. The spacers defining an annular cylinder having an internal diameter less than a combined diameter of the insert plus twice a wall thickness of the braid and an external diameter at most equal to an internal diameter of the sleeve. The sleeve is moved over the spacers. Longitudinal tension is applied to the braid to cause the insert to laterally expand the braid externally thereto and to correspondingly apply lateral outward force to the spacers. The sleeve restrains lateral outward movement of the spacers, thus locking the termination.

Other aspects and advantages of the invention will be apparent from the following description and the appended claims.

BRIEF DESCRIPTION OF THE DRAWINGS

FIGS. 3A and 3B show, respectively, a side and end view of a sleeve used in an example implementation of the invention.

FIGS. 4A, 4B and 4C, show, respectively, examples spacers used in the present invention.

FIG. 5 shows an example insert used in the present invention.

DETAILED DESCRIPTION

Figure 1:
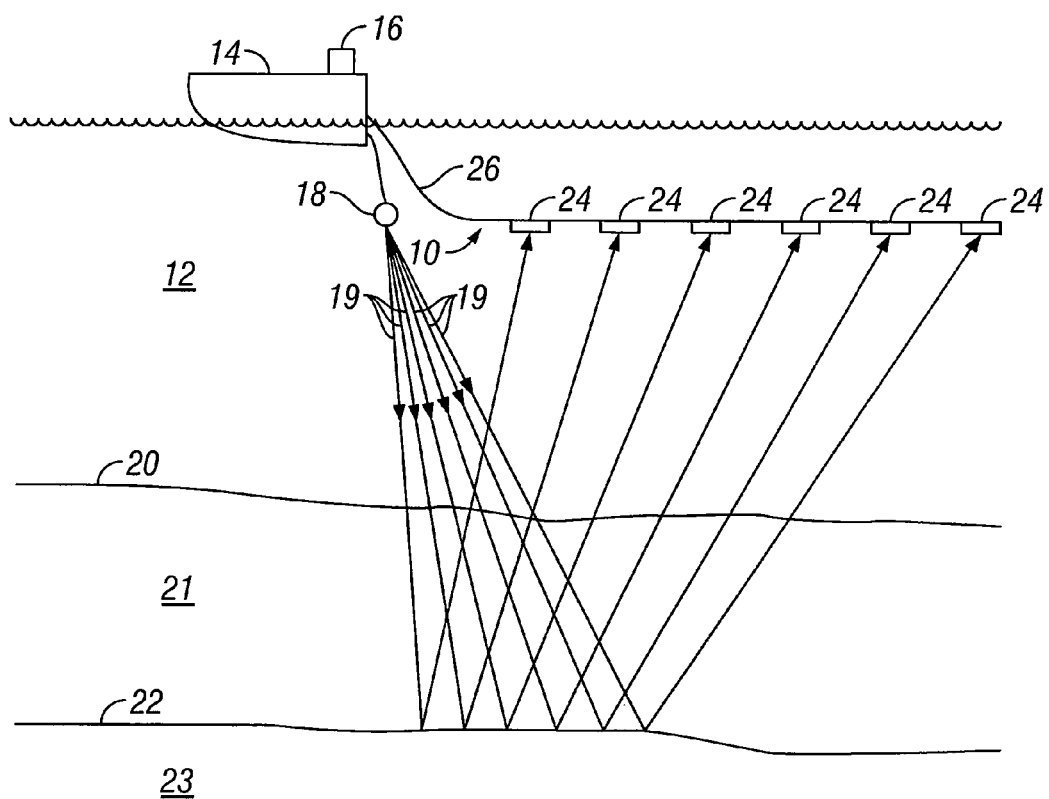
FIG. 1 shows an example seismic streamer being towed by a survey vessel.

An example marine seismic data acquisition system as it is typically used in a marine seismic survey is shown in FIG. 1. A seismic vessel 14 moves along the surface of a body of water 12 such as a lake or the ocean. The marine seismic survey is intended to detect and record seismic signals related to structure and composition of various subsurface Earth formations 21, 23 below the water bottom 20. The seismic vessel 14 includes source actuation, data recording and navigation equipment, shown generally at 16, referred to for convenience as a "recording system." The seismic vessel 14, or a different vessel (not shown), can tow one or more seismic energy sources 18, or arrays of such source(s) in the water 12. The system includes at least one seismic streamer 10, which includes a strength member 26 operatively coupled to the seismic vessel 14, and a plurality of sensors 24 or arrays of such sensors, disposed at spaced apart locations along the streamer 10. During operation, equipment (not shown separately) in the recording system 16 causes the source 18 to actuate at selected times. When actuated, the source 18 produces seismic energy 19 that emanates generally outwardly from the source 18. The energy 19 travels downwardly, through the water 12, and passes, at least in part, through the water bottom 20 into the formations 21, 23 below the water bottom 20. Seismic energy 19 can be reflected from one or more acoustic impedance boundaries 22 below the water bottom 20, and travels upwardly whereupon it may be detected by the sensors 24. Structure of the formations 21, 23 can be inferred by travel time of the energy 19 and by characteristics of the detected energy such as its amplitude and phase.

Figure 2:
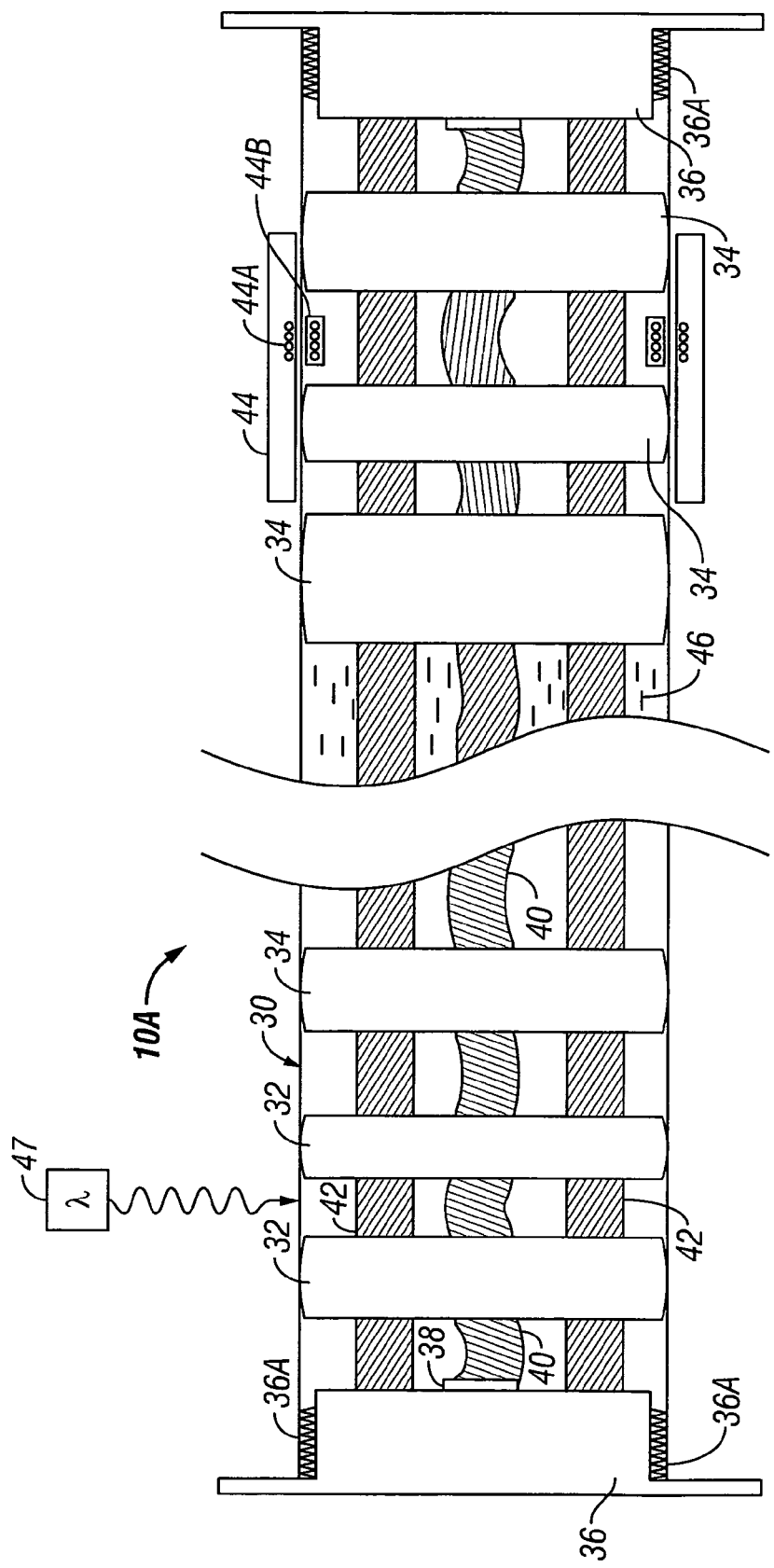
FIG. 2 shows a cross section of a typical seismic streamer segment.

FIG. 2 is a cut away view of a portion (segment) 10A of a marine seismic streamer (10 in FIG. 1). A streamer as shown in FIG. 1 may extend behind the seismic vessel (14 in FIG. 1) for several kilometers, and is typically made from a plurality of streamer segments, as shown in FIG. 2, connected end to end behind the seismic vessel (14 in FIG. 1).

The streamer segment 10A in the present embodiment may be about 75 meters overall length. The segment 10A includes a jacket 30, which in the present embodiment can be made from 3.5 mm thick transparent polyurethane, having a nominal external diameter of about 62 millimeters. In some embodiments, the jacket 30 may be externally banded in selected places with an alloy number 304 stainless steel, copper-flashed band (not shown).

In each segment 10A, each axial end of the jacket 30 may be terminated by a coupling/termination plate 36 ("termination plate"). The termination plate 36 may include elements 36A on the portion of its surface that is inserted into the end of the jacket 30 to seal against the inner surface of the jacket 30, and to grip the termination plate 36 to the jacket 30 when the jacket is clamped externally (not shown). In the present example, two strength members 42 are coupled to an appropriate coupling feature (not shown separately) located on the interior of each termination plate 36. The strength members 42 extend the length of the segment 10A. In a particular implementation of the invention, the strength members 42 may be made from woven a fiber braid, using a fiber sold under the mark VECTRAN, which is a registered trademark of Hoechst Celanese Corp., New York, N.Y. The strength members 42 transmit axial force along the length of the segment 10A. When one segment 10A is coupled end to end to another segment (not shown in FIG. 2), mating termination plates 36 are coupled together using any suitable connector, so that the axial force is transmitted through the termination plates 36 from the strength members 42 in one segment 10A to the strength member in the adjoining segment. As will be explained further below, the subject of the present invention concerns methods and devices for coupling the strength members 42 to the termination plates 36. In the present invention, the strength member 42 may be in a flat, braided form, similar in shape to a thick ribbon. For convenience in the following explanation, the strength member will be referred to as a "braid" to distinguish it from solid, circular cross section woven fiber ropes. The strength member flat braid may be made in form of a flat, closed loop that may be internally expanded into the shape of an annular cylinder. The thickness of the braid wall when configured as an annular cylinder may be referred to herein for convenience as the "wall thickness" of the braid.

The streamer segment 10A typically includes spacers 32 and 34 disposed inside the jacket 30 at spaced apart locations along its length. The spacers may be of two types; buoyancy spacers 32 and structural or sensor spacers 34. The buoyancy spacers 32 may be made from foamed polypropylene. The buoyancy spacers 32 have a density selected to provide the segment 10A with approximately the same overall density as seawater (12 in FIG. 1), so that the streamer (10 in FIG. 1) will be substantially neutrally buoyant in seawater. As a practical matter, the buoyancy spacers 32 provide the segment 10A with an overall density very slightly less than that of fresh water. Appropriate overall density may then be adjusted in actual use by adding selected amounts of dense ballast (not shown) to the exterior of the jacket 30, thus providing adjustment in the buoyancy for changes in water temperature and salinity. The sensor spacers 34 may be made from foamed polyurethane or other suitable material. The sensor spacers 34 are used to support the jacket and provide a mounting platform for the sensors (not shown separately in the Figures).

The segment 10A can include a generally centrally located conductor harness 40 which typically includes a plurality of insulated electrical conductors (not shown separately), and may include one or more optical fibers (not shown separately). The electrical and/or optical conductors in the conductor harness 40 conduct electrical and/or optical signals from the sensors to the recording system (16 in FIG. 1). The conductor harness 40 may also carry electrical power to various signal processing circuits (not shown separately) disposed in one or more segments 10A, or disposed elsewhere along the streamer (10 in FIG. 1). The length of the conductor harness 40 within the streamer segment 10A is generally longer than the overall axial length of the segment 10A under the largest expected axial stress, so that the electrical conductors (and optical fibers if present) in the conductor harness 40 will not experience any substantial axial stress when the streamer (10 in FIG. 1) is towed through the water by the seismic vessel. The conductors and optical fibers in the conductor harness 40 may be terminated in a connector 38 disposed in each termination plate 36, so that when the segments 10A are connected end to end, corresponding electrical and/or optical connections may be made between the electrical conductors and optical fibers in the conductor harness 40 in the adjoining segments 10A.

Sensors, which in the present embodiment may be hydrophones, velocity sensors, motion sensor, accelerometers or the like, can be disposed in selected ones of the sensor spacers, shown in FIG. 2 generally at 34. Hydrophones if used in the present embodiment can be or a type known to those of ordinary skill in the art, including but not limited to those sold under model number T-2BX by Teledyne Geophysical Instruments, Houston, Tex. In the present embodiment, each segment 10A may include 96 such hydrophones, disposed in arrays of sixteen individual hydrophones connected in electrical series. In a particular implementation of the invention, there are thus six such arrays, spaced apart from each other at about 12.5 meters. The spacing between individual hydrophones in each such array should be selected so that the axial span of the array is at most equal to about one half the wavelength of the highest frequency seismic energy intended to be detected by the streamer (10 in FIG. 1). It should be clearly understood that the types of sensors used, the electrical and/or optical connections used, the number of such sensors, and the spacing between such sensors are only used to illustrate one particular embodiment of the invention, and are not intended to limit the scope of this invention. In other examples, the sensors may be particle motion sensors such as geophones, or accelerometers and/or combinations of the foregoing with pressure responsive sensors. A marine seismic streamer having particle motion responsive sensors is described in U.S. Pat. No. 7,239,577 issued to Tenghamn et al.

At selected positions along the streamer (10 in FIG. 1) a compass bird 44 may be affixed to the outer surface of the jacket 30. The compass bird 44 typically includes a directional sensor (not shown separately) for determining the geographic orientation of the segment 10A at the location of the compass bird 44. The compass bird 44 may include an electromagnetic signal transducer 44A for communicating signals to a corresponding transducer 44B inside the jacket 30 for communication along the conductor(s) in the conductor harness 40 to the recording system (16 in FIG. 1). Measurements of direction are used, as known in the art, to infer the position of the various sensors 34 in the segment 10A, and thus along the entire length of the streamer (10 in FIG. 1). Typically, a compass bird will be affixed to the streamer (10 in FIG. 1) about every 300 meters (every four segments 10A). One type of compass bird is described in U.S. Pat. No. 4,481,611 issued to Burrage and incorporated herein by reference.

In the present example, the interior space of the jacket 30 may be filled with an acoustically transparent material 46 such as a blend of liquid hydrocarbon (oils) gelled by a radiation-curable cross-linked synthetic polymer. Application of such radiation is shown at 47 in FIG. 2. The gelled material 46, a mixture of the liquid hydrocarbon and the cross-linked polymer gelling agent, serves to exclude fluid (water) from the interior of the jacket 30, to electrically insulate the various components inside the jacket 30, and to transmit seismic energy freely through the jacket 30 to the sensors 34. The material 46 in its uncured state is essentially in liquid form. Upon gel formation, the material 46 no longer flows as a liquid, but instead becomes substantially gel-like. As a gel, the material 46 upon cure preferably retains some flexibility to bending stress and some elasticity, and freely transmits seismic energy to the sensors 34.

A strength member termination made according to one example of the present invention will now be explained with reference to FIGS. 3A through 7. FIG. 3A shows a side view and FIG. 3B shows a respective cross sectional view of a sleeve 50. The sleeve 50 may be a short length of thin walled tubing made, for example, of a lightweight high strength metal such as titanium. The sleeve 50 may have an internal diameter sufficient to allow spacers (explained below with reference to FIGS. 4A through 4C) pass through the sleeve 50 with some diametric clearance when the spacers are fully seated against each other. The inside edges of the sleeve 50 may be beveled to remove sharp edges that might cut into the braid of the strength member (42 in FIG. 2). The function of the sleeve 50 will be further explained below.

FIGS. 4A, 4B and 4C show, respectively, spacers used in the present example. The spacers, 52A in FIG. 4A and 52C in FIG. 4C in the present example each is a half cylinder that may be made from high durometer, high strength plastic. The radius of curvature of the spacers 52A, 52C is selected so that the outside diameter defined by the spacers 52A, 52C when the two spacers 52A, 52C are positioned face to face (i.e., such that their circumferential ends are in contact) will fit inside sleeve (50 in FIG. 3A) with substantially minimum practical clearance. The inside diameter defined the spacers 52A, 52C when they are positioned as explained above forms a tight fit around a compressed area of the strength member (42 in FIG. 2) braid when it is passed inside itself with an insert (explained below) disposed inside the braid. The axial length of the spacers 52A, 52C may be the same as that of the sleeve (50 in FIG. 3A). The spacers 52A, 52C are beveled, at one longitudinal end at an angle that may be selected to match the bevel angle of one end the insert (explained below with reference to FIG. 5). The bevel is shown more clearly at 52B in FIG. 4B. The opposite end longitudinal of the spacers as shown at 52D may be either rounded or beveled to prevent cutting of the strength member (42 in FIG. 2) braid. Although only two, semi cylindrical spacers are shown in FIGS. 4A and 4C that are applied to the exterior of the braid, any other number of cylindrical segments may be used in other implementations provided that the radii of curvature of the segments define the above stated internal and external diameters. It is only necessary for purposes of the invention that the spacers be substantially rigid, yet susceptible to lateral expansion by action of the bevel on the insert (see FIG. 5) when longitudinal (axial) tension is applied to the braid.

FIG. 5 shows the previously mentioned insert at 54A. The insert 54A may be formed from a selected length of plastic rod or similar material. The length of the insert 54A is selected to provide sufficient axial strength for the termination, but may be made short enough for the maximum termination length that may be permitted in the particular use. Those skilled in the art will appreciate that the length along the strength member (42 in FIG. 2) of the components that comprise the termination is related to how close to the termination plate (36 in FIG. 2) components of a streamer segment such as spacers, etc. may be placed. Excessively long terminations reduce the available longitudinal mounting distance within each streamer segment, and the present invention is intended to enable providing a relatively short axial termination with a holding strength approaching the rated breaking strength of the braid (strength member 42 in FIG. 2).

The diameter of the insert 54A is small enough to fit readily inside the strength member (42 in FIG. 2) when the flat, closed loop is expanded into an annular cylinder, and is large enough to expand the cylindrical diameter of the strength member (42 in FIG. 2) when inserted therein to allow the expanded strength member end to just fit inside itself. That is, the external diameter of the insert 54A is selected such that when it is inserted into the braid, the annular cylinder thus formed has an external diameter (which will include the insert diameter plus four times the wall thickness of the braid) to fit in the interior of the annular cylinder defined by the braid when so expanded.

One longitudinal end 54B of the insert 54A may have a relatively long taper, for example, of about one third the overall length of the insert 54A. The opposite longitudinal end 54C of the insert 54A may have a taper or bevel angle of between 20 degrees and 60 degrees, and may match the taper or bevel angle in one longitudinal end of the spacers (see FIG. 4B) as explained above.

An example technique for assembling the foregoing components to a strength member to form a closed loop termination therein will now be explained with reference to FIGS. 6A through 6E and 7.

First, the end of the strength member 42 may be tapered at its longitudinal end. Tapering in the present example may include cutting off several of the individual strands that are woven to form the braid of the strength member. In the present example, the braid may include 24 fiber strands. In the present example and referring to FIG. 6A, 18 strands may be cut off from one inch of the braid starting at the longitudinal end, leaving six strands in the braid, as shown at 42A. From two inches from the longitudinal end of the braid to one inch therefrom, only twelve strands may be cut, leaving twelve strands as shown at 42B. At three inches from the end of the braid to two inches therefrom, only six strands may be cut, leaving eighteen strands as shown at 42C. The foregoing is only one example of tapering the braid and is not intended to limit the scope of the invention. The purpose for tapering the longitudinal end of the braid is to facilitate assembly of the termination.

The sleeve (50 in FIG. 2 may then be moved over the end of the braid and positioned between locations marked at 66A and 64A. The longitudinal position relative to the braid of the sleeve is shown in FIG. 6E.

After the sleeve (50 in FIG. 6E) is moved onto the braid, a device known in the art of rope working as a "fid tool" (not shown) may be affixed to the tapered end of the braid. The fid tool (not shown) may be used to pull the braid longitudinal end through or around the fitting in the termination plate (36 in FIG. 2, not shown separately) so as to form a loop. After looping the braid over the fitting (not shown) in the termination plate, the fid tool may then be used to insert the end of the braid into the body of the braid. A suitable example entry point for the fid tool and the end of the braid is shown at 66 in FIG. 6A. The longitudinal end of the braid is then moved longitudinally inside the body of the braid in a direction toward the left in FIG. 6A. The longitudinal movement continues to a selected exit point, a suitable one of which is shown at 60 in FIG. 6A. Longitudinal movement of the fid tool and the braid out from the exit point 60 may continue until a suitable length of the untapered braid (beyond 42C in FIG. 6A) is exposed beyond the exit point 60. Such length may be twice the length of the insert (54 in FIG. 6B). The fid tool (not shown) may then be removed, and the insert (54 in FIG. 6B) may be inserted into the protruding, tapered end of the braid. The insert 54 should be inserted with the short tapered or bevelled end (i.e., 54C in FIG. 5) facing the protruding braid end. When the insert 54 is moved fully longitudinally inside the braid, the opposite longitudinal end of the braid, covering the end of the insert 54, may be covered with a "serving", (see 54B in FIG. 7 and FIG. 6C) which is a device known in the art of rope working to secure free rope fiber ends. The end of the braid with the insert 54 and serving (54B in FIGS. 7 and 6C) is then moved back inside the braid (42 in FIG. 6A) so that none of the end of the braid disposed inside itself remains exposed through the exit point (60 in FIG. 6A).

Figure 6A:
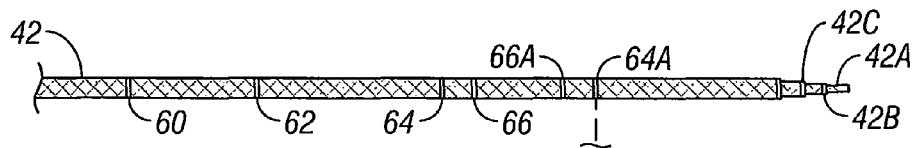
FIGS. 6A through 6E show, respectively, tapering a strength member, and relative axial positions of the sleeve, inserts and spacer according to the invention.
Figure 6B:
Figure 6C:
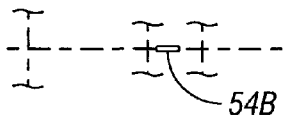
Figure 6D:
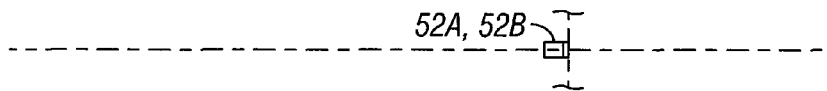
Figure 6E:
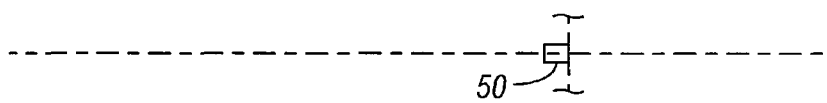
Figure 7:
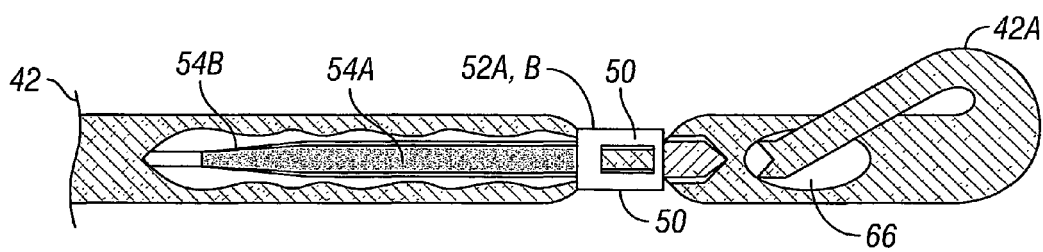
FIG. 7 shows using the sleeve, spacers and insert to create a closed loop termination in the strength member.

When the braid end with insert and serving are fully inserted back into the interior of the braid, the spacers (52A, 52B in FIG. 6C) may be applied to the exterior of the braid approximately at the longitudinal position of the forward longitudinal end (the bevelled end (54C in FIG. 5) of the insert (54A in FIG. 5 and FIG. 6B). The sleeve 50 in FIG. 6E may then be moved longitudinally over the spacers (52A, 52B in FIG. 6C). Applying longitudinal tension away from the loop termination thus created will tend to force the bevelled end (54C in FIG. 5) of the insert (54A in FIG. 5) to laterally expand the diameter of the braid trapped between the end of the insert and the interior of the spacers (52A in FIG. 4A and 52B in FIG. 4C). Such lateral expansion will be restrained externally by the spacers, whose lateral movement is restrained by the sleeve (50 in FIG. 3A). Thus, axial tension on the braid tends to tighten the termination. The assembled termination is shown in cut away view in FIG. 7, wherein the portion of the braid that is looped over the fitting in the termination plate is shown at 42A and enters the braid 42 at the entry point 66. The insert 54A is shown in its approximate final position, wherein the forward end thereof is located proximate the spacers 52A, 52B and sleeve 50.

While the present invention is described in terms of a strength member termination for use in a seismic streamer, it will be appreciated by those skilled in the art that the invention may have application to any braided rope or cable termination that requires the termination to be formed around a fixed coupling or other device that cannot be opened, that is, the loop end of the rope or braid cannot be closed before being threaded around the device.

A termination for a flat braid made according to the invention may provide an easy to assemble open loop termination (i.e., a loop that is closed only after attachment to the device to which the termination is coupled) that uses readily manufacturable, inexpensive components, has a relatively short axial length, and in such relatively short axial length provides a termination strength that can approach the breaking strength of the flat braid.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A termination for a braid end, wherein the braid is formed as a flat closed loop of braided strands configured to be expanded to a shape of an annular cylinder having a selected wall thickness, the termination comprising:
   a sleeve having a selected internal diameter and disposed on an exterior surface of the braid;
   spacers configured to be applied to an exterior of the braid, a configuration and an external diameter of the spacers when in contact with each other forming an annular cylinder having an external diameter selected to fit inside the sleeve, the spacers having a bevel at one longitudinal end thereof;
   a substantially cylindrical insert having a bevel at one longitudinal end thereof at substantially a same bevel angle as the bevel on the spacers, the insert disposed in a longitudinal end of the braid, the longitudinal end of the braid having the insert therein and the spacers thereon inserted into an opening formed in the braid to a position of the sleeve; and
   wherein an external diameter of the insert is selected such that when combined with twice the wall thickness of the braid, such combined diameter is larger than an internal diameter of the annular cylinder formed by the spacers such that when axial tension is applied to the braid, the bevel at the longitudinal end of the insert with braid thereon laterally urges the spacers outward, and wherein the sleeve is disposed externally to the spacers to limit lateral outward movement thereof.

2. The termination of claim 1 wherein the bevel angle is in a range of about 20 to 60 degrees.

3. The termination of claim 1 wherein the sleeve is made from titanium.

4. The termination of claim 1 wherein the insert is made from plastic.

5. The termination of claim 1 wherein the spacers are each a half cylinder.

6. The termination of claim 1 wherein the spacers are made from plastic.

7. The termination of claim 1 wherein the braid is made from woven fiber strands.

8. The termination of claim 1 wherein a longitudinal end of the braid includes a tapered wall thickness.

9. The termination of claim 1 wherein the braid is disposed inside a jacket of a seismic streamer as a strength member therefor.

10. The termination of claim 9 wherein the termination is coupled to a termination plate at an end of a segment of the seismic streamer.

11. A seismic streamer, comprising:
- at least one streamer segment, the at least one segment including at least one strength member extending along a length of the segment and terminated at each longitudinal end by a termination coupled to a termination plate, the at least one strength member comprising a flat woven braid reconfigurable to an annular cylinder having a selected wall thickness;
- a plurality of spacers disposed at selected longitudinal positions along the at least one strength member;
- at least one seismic sensor; and
- a jacket disposed over the exterior of the at least one strength member, the spacers and the at least one seismic sensor, wherein each termination comprises a sleeve having a selected internal diameter and disposed on an exterior of the braid, spacers configured to be applied to an exterior of the braid, a configuration and an external diameter of the spacers when in contact with each other forming an annular cylinder having an external diameter selected to fit inside the sleeve, the spacers having a bevel at one longitudinal end thereof, a substantially cylindrical insert having a bevel at one longitudinal end thereof at substantially a same bevel angle as the bevel on the spacers, the insert disposed in a longitudinal end of the braid, the longitudinal end of the braid having the insert therein and the spacers thereon inserted into an opening formed in the braid to a position of the sleeve, and wherein an external diameter of the insert is selected such that when combined with twice the wall thickness of the braid, such combined diameter is larger than an internal diameter of the annular cylinder formed by the spacers such that when axial tension is applied to the braid, the bevel at the longitudinal end of the insert with braid thereon laterally urges the spacers outward, and wherein the sleeve is disposed externally to the spacers to limit lateral outward movement thereof.

12. The streamer of claim 11 wherein the bevel angle is in a range of about 20 to 60 degrees.

13. The streamer of claim 11 wherein the sleeve is made from titanium.

14. The streamer of claim 11 wherein the insert is made from plastic.

15. The streamer of claim 11 wherein the spacers are each a half cylinder.

16. The streamer of claim 11 wherein the spacers are made from plastic.

17. The streamer of claim 11 wherein the braid is made from woven fiber strands.

18. The streamer of claim 11 wherein a longitudinal end of the braid includes a tapered wall thickness.

19. A method for making a loop end termination in a woven braid wherein the braid is formed as a flat closed loop of braided strands configured to be expanded to a shape of an annular cylinder, the method comprising:
- tapering a longitudinal end of the braid;
- applying a sleeve having a selected internal diameter over the braid from the longitudinal end thereof;
- looping the longitudinal end of the braid over a termination coupling;
- inserting the longitudinal end of the braid into the braid at a location spaced apart from the termination coupling, the inserting continuing to a selected exit point from the braid at a position longitudinally spaced apart from the insertion location;
- disposing an insert having a selected angle bevel on an insertion end thereof into the tapered longitudinal end of the braid extending through the exit point;
- moving the part of the braid disposed through the exit point back into the braid;
- applying spacers to an exterior surface of the braid proximate the insertion end of the insert, the spacers defining an annular cylinder having an internal diameter less than a combined diameter of the insert plus twice a wall thickness of the braid and an external diameter at most equal to an internal diameter of the sleeve;
- moving the sleeve over the spacers; and
- applying longitudinal tension to the braid to cause the insert to laterally expand the braid externally thereto and to correspondingly apply lateral outward force to the spacers, and wherein the sleeve restrains lateral outward movement of the spacers.

20. The method of claim 19 wherein the termination coupling is disposed in a termination plate of a seismic streamer segment.

* * * * *